US010133607B2

(12) United States Patent
Suit

(10) Patent No.: US 10,133,607 B2
(45) Date of Patent: *Nov. 20, 2018

(54) MIGRATION OF NETWORK ENTITIES TO A CLOUD INFRASTRUCTURE

(71) Applicant: RED HAT, INC.

(72) Inventor: John Michael Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,738

(22) Filed: Jun. 12, 2017

(65) Prior Publication Data

US 2017/0277572 A1 Sep. 28, 2017

Related U.S. Application Data

(63) Continuation of application No. 12/905,645, filed on Oct. 15, 2010, now Pat. No. 9,678,803.

(51) Int. Cl.
*G06F 15/177* (2006.01)
*G06F 9/50* (2006.01)
(Continued)

(52) U.S. Cl.
CPC ........ *G06F 9/5072* (2013.01); *H04L 41/0816* (2013.01); *H04L 41/0893* (2013.01);
(Continued)

(58) Field of Classification Search
CPC ... H04L 41/0893; H04L 41/12; H04L 67/148; G06F 9/5072; G06F 9/5088
See application file for complete search history.

(56) References Cited

U.S. PATENT DOCUMENTS 5,440,719 A   8/1995   Hanes et al.
6,513,059 B1   1/2003   Gupta et al.
(Continued)

FOREIGN PATENT DOCUMENTS

WO   WO2003055180   7/2003
WO   WO2005050414   6/2005
WO   WO2005101782   10/2005

OTHER PUBLICATIONS

Red Hat Office Action for U.S. Appl. No. 12/905,565, dated Oct. 12, 2012.
(Continued)

*Primary Examiner* — Nam T Tran
(74) *Attorney, Agent, or Firm* — Lowenstein Sandler LLP

(57) ABSTRACT

A method for migrating network entities to a cloud computing infrastructure includes receiving an indication of at least one node of a plurality of nodes to migrate from an enterprise network to a cloud computing infrastructure, identifying one or more related nodes of the plurality of nodes that have direct and indirect communication relationships with the indicated node, and adding the indicated node and at least one node of the related nodes for the indicated node to a migration group. The method includes preparing a migration-configuration file for each node of the migration group, the migration-configuration file comprising service level agreement (SLA) information, deploying a migration agent to each node of the migration group, and migrating the migration group to the cloud computing infrastructure, wherein each node of the migration group is migrated using a corresponding migration-configuration file to generate an SLA for each node of the migration group with a provider of the cloud computing infrastructure in view of SLA information from the corresponding migration configuration file.

20 Claims, 9 Drawing Sheets

(51) Int. Cl.
*H04L 12/24* (2006.01)
*H04L 29/08* (2006.01)

(52) U.S. Cl.
CPC ............ *G06F 9/5088* (2013.01); *H04L 41/12* (2013.01); *H04L 67/148* (2013.01)

(56) References Cited

U.S. PATENT DOCUMENTS

| | | | |
|---|---|---|---|
| 6,658,465 B1 | 12/2003 | Touboul | |
| 6,836,800 B1 | 12/2004 | Sweet et al. | |
| 6,871,223 B2 | 3/2005 | Drees | |
| 6,901,442 B1 | 3/2005 | Schwaller et al. | |
| 7,082,463 B1 | 7/2006 | Bradley et al. | |
| 7,181,769 B1 | 2/2007 | Keanini et al. | |
| 7,356,679 B1 | 4/2008 | Le et al. | |
| 7,409,719 B2 | 8/2008 | Armstrong et al. | |
| 7,546,598 B2 | 6/2009 | Blumenthal et al. | |
| 7,571,349 B2 | 8/2009 | Levidow et al. | |
| 7,600,259 B2 | 10/2009 | Qi | |
| 7,624,172 B1 | 11/2009 | Austin-Lane | |
| 7,698,545 B1 | 4/2010 | Campbell et al. | |
| 7,761,917 B1 | 7/2010 | Kumar | |
| 7,769,720 B2 | 8/2010 | Armington | |
| 7,774,498 B1 | 8/2010 | Kraemer et al. | |
| 7,793,162 B2 | 9/2010 | Mock et al. | |
| 7,826,602 B1 | 11/2010 | Hunyady et al. | |
| 7,877,781 B2 | 1/2011 | Lim | |
| 7,886,294 B2 | 2/2011 | Dostert et al. | |
| 7,890,318 B2 | 2/2011 | Castellani et al. | |
| 7,949,404 B2 | 5/2011 | Hill | |
| 7,953,696 B2 | 5/2011 | Davis et al. | |
| 7,962,738 B2 | 6/2011 | Zimmer et al. | |
| 7,975,058 B2 | 7/2011 | Okmianski et al. | |
| 7,987,359 B2 | 7/2011 | Kawano et al. | |
| 7,996,836 B1 | 8/2011 | McCorkendale et al. | |
| 8,043,785 B2 | 10/2011 | Inoue et al. | |
| 8,065,714 B2 | 11/2011 | Budko et al. | |
| 8,098,658 B1 | 1/2012 | Ranganathan et al. | |
| 8,102,781 B2 | 1/2012 | Smith | |
| 8,104,458 B2 | 1/2012 | Hoffman | |
| 8,127,290 B2 | 2/2012 | Suit | |
| 8,145,760 B2 | 3/2012 | Dinda et al. | |
| 8,156,378 B1 | 4/2012 | Suit | |
| 8,161,475 B2 | 4/2012 | Araujo et al. | |
| 8,185,442 B2 | 5/2012 | Kiran Vedula | |
| 8,191,141 B2 | 5/2012 | Suit | |
| 8,234,377 B2 | 7/2012 | Cohn | |
| 8,250,182 B2 | 8/2012 | Frank et al. | |
| 8,295,277 B2 | 10/2012 | Vadlakonda et al. | |
| 8,336,108 B2 | 12/2012 | Suit | |
| 8,356,353 B2 | 1/2013 | Futoransky et al. | |
| 8,396,946 B1 | 3/2013 | Brandwine et al. | |
| 8,429,748 B2 | 4/2013 | Suit | |
| 8,478,878 B2 | 7/2013 | Freimuth et al. | |
| 8,539,570 B2 | 9/2013 | Sharma et al. | |
| 8,550,442 B2 | 10/2013 | Philippe | |
| 8,560,671 B1 | 10/2013 | Yahalom et al. | |
| 8,656,009 B2 | 2/2014 | Suit | |
| 8,656,219 B2 | 2/2014 | Suit | |
| 8,850,423 B2 | 9/2014 | Barkie et al. | |
| 8,850,442 B2 | 9/2014 | Davis et al. | |
| 9,043,785 B1 | 5/2015 | Suit | |
| 2003/0014626 A1 | 1/2003 | Poeluev | |
| 2003/0046586 A1 | 3/2003 | Bheemarasetti et al. | |
| 2003/0084329 A1 | 5/2003 | Tarquini | |
| 2003/0101245 A1 | 5/2003 | Srinivasan et al. | |
| 2003/0120935 A1 | 6/2003 | Teal et al. | |
| 2003/0145225 A1 | 7/2003 | Burton et al. | |
| 2003/0158983 A1 | 8/2003 | Dalakuras et al. | |
| 2003/0177112 A1 | 9/2003 | Gardner | |
| 2003/0182597 A1 | 9/2003 | Coha et al. | |
| 2003/0225876 A1 | 12/2003 | Oliver et al. | |
| 2004/0122937 A1 | 6/2004 | Huang et al. | |
| 2004/0133672 A1 | 7/2004 | Bhattacharya et al. | |
| 2005/0010765 A1 | 1/2005 | Swander et al. | |
| 2005/0044206 A1 | 2/2005 | Johansson et al. | |
| 2005/0102529 A1 | 5/2005 | Buddhikot et al. | |
| 2005/0125503 A1 | 6/2005 | Iyengar et al. | |
| 2005/0125520 A1 | 6/2005 | Hanson et al. | |
| 2005/0240558 A1 | 10/2005 | Gil et al. | |
| 2005/0240606 A1 | 10/2005 | Edelstein et al. | |
| 2005/0268298 A1 | 12/2005 | Hunt et al. | |
| 2005/0289648 A1 | 12/2005 | Grobman et al. | |
| 2006/0023638 A1 | 2/2006 | Monaco et al. | |
| 2006/0036426 A1 | 2/2006 | Barr et al. | |
| 2006/0037072 A1 | 2/2006 | Rao et al. | |
| 2006/0041885 A1 | 2/2006 | Broquere et al. | |
| 2006/0069768 A1 | 3/2006 | Wen et al. | |
| 2006/0074833 A1 | 4/2006 | Gardner et al. | |
| 2006/0123133 A1 | 6/2006 | Hrastar | |
| 2006/0136720 A1 | 6/2006 | Armstrong et al. | |
| 2006/0156380 A1 | 7/2006 | Gladstone et al. | |
| 2006/0195715 A1 | 8/2006 | Herington | |
| 2006/0230134 A1 | 10/2006 | Qian et al. | |
| 2006/0271395 A1 | 11/2006 | Harris et al. | |
| 2007/0011667 A1 | 1/2007 | Subbiah et al. | |
| 2007/0043860 A1 | 2/2007 | Pabari | |
| 2007/0058551 A1 | 3/2007 | Brusotti et al. | |
| 2007/0061382 A1 | 3/2007 | Davis et al. | |
| 2007/0073882 A1 | 3/2007 | Brown et al. | |
| 2007/0083506 A1 | 4/2007 | Liddell et al. | |
| 2007/0118394 A1 | 5/2007 | Cahoon | |
| 2007/0130566 A1 | 6/2007 | van Rietschote et al. | |
| 2007/0147271 A1 | 6/2007 | Nandy et al. | |
| 2007/0169121 A1 | 7/2007 | Hunt et al. | |
| 2007/0180081 A1 | 8/2007 | Okmianski et al. | |
| 2007/0198656 A1 | 8/2007 | Mazzaferri et al. | |
| 2007/0204153 A1 | 8/2007 | Tome et al. | |
| 2007/0204347 A1 | 8/2007 | Caceres et al. | |
| 2007/0220121 A1 | 9/2007 | Suwarna | |
| 2007/0234412 A1 | 10/2007 | Smith et al. | |
| 2007/0234425 A1 | 10/2007 | Kim et al. | |
| 2007/0238524 A1 | 10/2007 | Harris et al. | |
| 2007/0261112 A1 | 11/2007 | Todd et al. | |
| 2008/0005124 A1 | 1/2008 | Jung et al. | |
| 2008/0016115 A1 | 1/2008 | Bahl et al. | |
| 2008/0016570 A1 | 1/2008 | Capalik | |
| 2008/0047009 A1 | 2/2008 | Overcash et al. | |
| 2008/0056487 A1 | 3/2008 | Akyol et al. | |
| 2008/0089338 A1 | 4/2008 | Campbell et al. | |
| 2008/0126856 A1 | 5/2008 | Levidow et al. | |
| 2008/0134175 A1 | 6/2008 | Fitzgerald et al. | |
| 2008/0140795 A1 | 6/2008 | He et al. | |
| 2008/0184225 A1 | 7/2008 | Fitzgerald et al. | |
| 2008/0256010 A1 | 10/2008 | Moran et al. | |
| 2008/0263658 A1 | 10/2008 | Michael et al. | |
| 2008/0270049 A1 | 10/2008 | Kim et al. | |
| 2008/0270104 A1 | 10/2008 | Stratton et al. | |
| 2008/0271025 A1 | 10/2008 | Gross et al. | |
| 2008/0288962 A1 | 11/2008 | Greifeneder et al. | |
| 2008/0320123 A1 | 12/2008 | Houlihan et al. | |
| 2008/0320499 A1 | 12/2008 | Suit et al. | |
| 2008/0320561 A1 | 12/2008 | Suit et al. | |
| 2008/0320583 A1 | 12/2008 | Sharma et al. | |
| 2008/0320592 A1 | 12/2008 | Suit et al. | |
| 2009/0007270 A1 | 1/2009 | Futoransky et al. | |
| 2009/0028053 A1 | 1/2009 | Kannan et al. | |
| 2009/0049453 A1 | 2/2009 | Baran et al. | |
| 2009/0064136 A1 | 3/2009 | Dow et al. | |
| 2009/0089781 A1 | 4/2009 | Shingai et al. | |
| 2009/0119301 A1 | 5/2009 | Cherkasova et al. | |
| 2009/0172666 A1 | 7/2009 | Yahalom et al. | |
| 2009/0182880 A1 | 7/2009 | Inamdar et al. | |
| 2009/0182928 A1 | 7/2009 | Becker et al. | |
| 2009/0183173 A1 | 7/2009 | Becker et al. | |
| 2009/0204701 A1 | 8/2009 | Herzog et al. | |
| 2009/0210427 A1 | 8/2009 | Eidler et al. | |
| 2009/0216816 A1 | 8/2009 | Basler et al. | |
| 2009/0228579 A1 | 9/2009 | Sanghvi et al. | |
| 2009/0228589 A1 | 9/2009 | Korupolu | |
| 2009/0254993 A1 | 10/2009 | Leone | |
| 2009/0293022 A1 | 11/2009 | Fries | |
| 2009/0307689 A1 | 12/2009 | Sudhakar | |
| 2009/0307772 A1 | 12/2009 | Markham et al. | |

(56) References Cited

U.S. PATENT DOCUMENTS

| | | |
|---|---|---|
| 2010/0011200 A1 | 1/2010 | Rosenan |
| 2010/0017801 A1 | 1/2010 | Kundapur |
| 2010/0031258 A1 | 2/2010 | Takano et al. |
| 2010/0049731 A1 | 2/2010 | Kiran Vedula |
| 2010/0077078 A1 | 3/2010 | Suit et al. |
| 2010/0110932 A1 | 5/2010 | Doran et al. |
| 2010/0138390 A1 | 6/2010 | Lobo et al. |
| 2010/0146503 A1 | 6/2010 | Tsai et al. |
| 2010/0161604 A1 | 6/2010 | Mintz et al. |
| 2010/0205304 A1 | 8/2010 | Chaturvedi et al. |
| 2010/0269109 A1 | 10/2010 | Cartales |
| 2010/0281482 A1 | 11/2010 | Pike et al. |
| 2010/0287263 A1 | 11/2010 | Liu et al. |
| 2010/0293544 A1 | 11/2010 | Wilson et al. |
| 2010/0318609 A1 | 12/2010 | Lahiri et al. |
| 2010/0332432 A1 | 12/2010 | Hirsch |
| 2011/0113467 A1 | 5/2011 | Agarwal et al. |
| 2011/0126198 A1 | 5/2011 | Vike et al. |
| 2011/0126207 A1 | 5/2011 | Wipfel et al. |
| 2011/0154329 A1 | 6/2011 | Arcese et al. |
| 2011/0209140 A1 | 8/2011 | Scheldel et al. |
| 2011/0225277 A1 | 9/2011 | Freimuth et al. |
| 2011/0231839 A1 | 9/2011 | Bennett et al. |
| 2011/0289204 A1 | 11/2011 | Hansson et al. |
| 2012/0011254 A1 | 1/2012 | Jamjoom et al. |
| 2012/0054346 A1 | 3/2012 | Lee et al. |
| 2012/0072968 A1 | 3/2012 | Wysopal et al. |
| 2012/0096065 A1 | 4/2012 | Suit et al. |
| 2012/0096134 A1 | 4/2012 | Suit |
| 2012/0096142 A1 | 4/2012 | Suit |
| 2012/0096143 A1 | 4/2012 | Suit |
| 2012/0096171 A1 | 4/2012 | Suit |
| 2012/0136989 A1 | 5/2012 | Ferris et al. |
| 2012/0167214 A1 | 6/2012 | Suit |
| 2012/0185913 A1 | 7/2012 | Martinez et al. |
| 2012/0221898 A1 | 8/2012 | Suit |
| 2013/0055341 A1 | 2/2013 | Cooper et al. |
| 2013/0060839 A1 | 3/2013 | Van Biljon et al. |
| 2013/0091496 A1 | 4/2013 | Barsness et al. |
| 2013/0143522 A1 | 6/2013 | Rege et al. |
| 2013/0275975 A1 | 10/2013 | Masuda et al. |
| 2014/0109083 A1 | 4/2014 | Scheldel et al. |
| 2015/0143366 A1 | 5/2015 | Suragi Math et al. |

OTHER PUBLICATIONS

Red Hat Office Action for U.S. Appl. No. 12/905,565, dated Apr. 11, 2013.
Red Hat Office Action for U.S. Appl. No. 12/905,565, dated Sep. 27, 2013.
Red Hat Notice of Allowance for U.S. Appl. No. 12/905,565, dated Apr. 18, 2014.
Red Hat Office Action for U.S. Appl. No. 12/905,645, dated Sep. 13, 2012.
Red Hat Office Action for U.S. Appl. No. 12/905,645, dated Mar. 26, 2013.
Red Hat Office Action for U.S. Appl. No. 12/905,645, dated Nov. 18, 2015.
Red Hat Office Action for U.S. Appl. No. 12/905,688, dated Oct. 4, 2012.
Red Hat Office Action for U.S. Appl. No. 12/905,688, dated Feb. 27, 2013.
Red Hat Office Action for U.S. Appl. No. 12/905,688, dated Mar. 18, 2014.
Red Hat Notice of Allowance for U.S. Appl. No. 12/905,688, dated Sep. 10, 2014.
Red Hat Notice of Allowance for U.S. Appl. No. 12/905,645, dated Feb. 10, 2017.
Red Hat Office Action for U.S. Appl. No. 12/905,761, dated Oct. 22, 2012.
Red Hat Office Action for U.S. Appl. No. 12/905,761, dated Apr. 11, 2013.
Red Hat Notice of Allowance for U.S. Appl. No. 12/905,761, dated Oct. 4, 2013.
Red Hat Office Action for U.S. Appl. No. 12/905,850, dated Dec. 6, 2012.
Red Hat Office Action for U.S. Appl. No. 12/905,850, dated Jul. 30, 2013.
Red Hat Office Action for U.S. Appl. No. 12/905,850, dated Feb. 18, 2014.
Red Hat Office Action for U.S. Appl. No. 12/905,850, dated Sep. 29, 2014.
Red Hat Office Action for U.S. Appl. No. 12/905,850, dated Jun. 3, 2015.
Red Hat Office Action for U.S. Appl. No. 12/905,850, dated Dec. 22, 2015.
Red Hat Notice of Allowance for U.S. Appl. No. 12/905,850, dated Apr. 21, 2016.
Red Hat Office Action for U.S. Appl. No. 12/905,879, dated Jul. 8, 2011.
Red Hat Notice of Allowance for U.S. Appl. No. 12/905,879, dated Dec. 8, 2011.
Red Hat Office Action for U.S. Appl. No. 13/439,803, dated Aug. 31, 2012.
Red Hat Notice of Allowance for U.S. Appl. No. 13/439,803, dated Feb. 21, 2012.
Red Hat Office Action for U.S. Appl. No. 11/767,173, dated Jul. 6, 2010.
Red Hat Office Action for U.S. Appl. No. 11/767,173, dated Dec. 14, 2010.
Red Hat Notice of Allowance for U.S. Appl. No. 11/767,173, dated Nov. 7, 2011.
Red Hat Office Action for U.S. Appl. No. 13/408,980, dated Feb. 25, 2013.
Red Hat Notice of Allowance for U.S. Appl. No. 13/408,980, dated Jun. 12, 2013.
Red Hat Office Action for U.S. Appl. No. 11/867,456, dated Aug. 1, 2011.
Red Hat Office Action for U.S. Appl. No. 11/867,456, dated Feb. 16, 2011.
Red Hat Office Action for U.S. Appl. No. 11/867,456, dated Jan. 19, 2012.
Red Hat Notice of Allowance for U.S. Appl. No. 11/867,456, dated Jul. 16, 2012.
Red Hat Office Action for U.S. Appl. No. 12/111,110, dated Mar. 17, 2011.
Red Hat Office Action for U.S. Appl. No. 12/111,110, dated Aug. 17, 2011.
Red Hat Office Action for U.S. Appl. No. 12/111,110, dated Jan. 18, 2012.
Red Hat Office Action for U.S. Appl. No. 12/111,110, dated Jun. 11, 2012.
Red Hat Notice of Allowance for U.S. Appl. No. 12/111,110, dated Jan. 31, 2013.
Red Hat Office Action for U.S. Appl. No. 12/626,872, dated Jan. 13, 2012.
Red Hat Office Action for U.S. Appl. No. 12/626,872, dated May 30, 2012.
Red Hat Notice of Allowance for U.S. Appl. No. 12/626,872, dated Dec. 20, 2012.
Red Hat Office Action for U.S. Appl. No. 12/013,304, dated Apr. 13, 2011.
Red Hat Office Action for U.S. Appl. No. 12/013,304, dated Oct. 4, 2011.
Red Hat Office Action for U.S. Appl. No. 12/013,304, dated Jul. 25, 2013.
Red Hat Notice of Allowance for U.S. Appl. No. 12/013,304, dated Sep. 18, 2014.
Red Hat Office Action for U.S. Appl. No. 12/013,314, dated Jul. 19, 2011.
Red Hat Office Action for U.S. Appl. No. 12/013,314, dated Mar. 7, 2012.
Red Hat Office Action for U.S. Appl. No. 12/013,314, dated Sep. 9, 2013.

(56) References Cited

OTHER PUBLICATIONS

Red Hat Notice of Allowance for U.S. Appl. No. 12/013,314, dated Jul. 28, 2014.
Red Hat Office Action for U.S. Appl. No. 11/867,500, dated Dec. 23, 2010.
Red Hat Notice of Allowance for for U.S. Appl. No. 11/867,500, dated Jun. 29, 2011.
Harwood, Aaron, Parallel Virtual Machine, Oct. 22, 2003, pp. 1-5.
Office Action for U.S. Appl. No. 11/867,456, dated Feb. 16, 2011.
Office Action for U.S. Appl. No. 11/867,500, dated Dec. 23, 2010.
Red Hat Notice of Allowance for U.S. Appl. No. 12/626,872, dated May 30, 2012.
Janiquec, "Virtual Server 2005 R2 Common Issues and Tps—Duplicate MAC Addresses," Nov. 29, 2007, pp. 1-2, online link: http://msvirt.wordpress.com/2007/11/29/virtual-server-2005-r2-common-issues-and-tips-duplicate-mac-addresses/.
Gao et al., "A Fast and Generic Hybrid Simulation Approach Using C Virtual Machine," ACM 978-1-50503-826-8/07/0009 Cases '07, Sep. 30, 2007.
Magnusson et al., "Simics: A Full System Simulation Platform," 0018-9162.02, IEEE 2002.
Red Hat Notice of Allowance for for U.S. Appl. No. 11/867,500, dated Oct. 14, 2011.
Chen et al., "Design and Implementation of a Large-Scale Context Fusion Network," Proceedings of the First Annual International Conference on Mobile and Ubiquitous Systems: Networking and Services (MobiQuitous '04).
Red Hat Office Action for U.S. Appl. No. 11/867,456, dated Feb. 19, 2012.
Red Hat Office Action for U.S. Appl. No. 12/905,688, dated Sep. 11, 2013.
Red Hat Office Action for U.S. Appl. No. 12/979,259, dated Jun. 5, 2013.
Red Hat Office Action for U.S. Appl. No. 12/979,259, dated Nov. 6, 2013.
Red Hat Office Action for U.S. Appl. No. 12/979,259, dated Jul. 3, 2014.
Red Hat Office Action for U.S. Appl. No. 12/979,259, dated Nov. 13, 2014.
Red Hat Office Action for U.S. Appl. No. 12/979,259, dated Mar. 12, 2015.
Red Hat Office Action for U.S. Appl. No. 12/979,259, dated Jul. 23, 2015.
Red Hat Office Action for U.S. Appl. No. 12/979,259, dated Jan. 19, 2016.
Red Hat Office Action for U.S. Appl. No. 12/979,259, dated Jun. 28, 2016.
Red Hat Office Action for U.S. Appl. No. 12/979,255, dated Dec. 27, 2012.
Red Hat Office Action for U.S. Appl. No. 12/979,255, dated May 3, 2013.
Red Hat Office Action for U.S. Appl. No. 12/979,255, dated Jul. 7, 2015.
Red Hat Office Action for U.S. Appl. No. 12/979,255, dated Nov. 23, 2015.
Red Hat Notice of Allowance for U.S. Appl. No. 12/979,255, dated Jun. 14, 2016.
Red Hat Office Action for U.S. Appl. No. 12/979,245, dated Jan. 8, 2013.
Red Hat Office Action for U.S. Appl. No. 12/979,245, dated May 24, 2013.
Red Hat Office Action for U.S. Appl. No. 12/979,245, dated Jul. 22, 2015.
Red Hat Office Action for U.S. Appl. No. 12/979,245, dated Nov. 23, 2015.
Red Hat Notice of Allowance for U.S. Appl. No. 12/979,245, dated Jun. 29, 2016.
Red Hat Office Action for U.S. Appl. No. 12/979,237, dated Jul. 1, 2013.
Red Hat Office Action for U.S. Appl. No. 12/979,237, dated Dec. 3, 2013.
Red Hat Office Action for U.S. Appl. No. 12/979,237, dated Apr. 23, 2014.
Red Hat Notice of Allowance for U.S. Appl. No. 12/979,237, dated Dec. 4, 2014.
Red Hat Notice of Allowance for U.S. Appl. No. 12/979,237, dated Jun. 25, 2015.
Red Hat Notice of Allowance for U.S. Appl. No. 12/979,237, dated Jan. 14, 2016.
Red Hat Office Action for U.S. Appl. No. 12/979,222, dated Dec. 27, 2012.
Red Hat Office Action for U.S. Appl. No. 12/979,222, datd Jul. 2, 2013.
Red Hat Office Action for U.S. Appl. No. 12/979,222, dated Nov. 20, 2015.
Red Hat Notice of Allowance for U.S. Appl. No. 12/979,222, dated Jun. 29, 2016.
Red Hat Office Action for U.S. Appl. No. 12/905,645, dated May 6, 2015.
Red Hat Office Action for U.S. Appl. No. 12/979,229, dated Apr. 4, 2013.
Red Hat Office Action for U.S. Appl. No. 12/979,229, dated Jul. 12, 2013.
Red Hat Office Action for U.S. Appl. No. 12/979,229, dated Aug. 12, 2013.
Red Hat Office Action for U.S. Appl. No. 12/979,229, dated Nov. 19, 2015.
Red Hat Notice of Allowance for U.S. Appl. No. 12/979,229, dated Oct. 19, 2016.

MIGRATION OF NETWORK ENTITIES TO A CLOUD INFRASTRUCTURE

CROSS-REFERENCE TO RELATED APPLICATIONS

This application is a continuation of U.S. patent application Ser. No. 12/905,645, filed Oct. 15, 2010. This application relates to applications: U.S. patent application Ser. No. 11/767,173, filed on Jun. 22, 2007, now U.S. Pat. No. 8,191,141, issued May 29, 2012, U.S. patent application Ser. No. 11/867,456, filed on Oct. 4, 2007, now U.S. Pat. No. 8,336,108, issued Dec. 18, 2012, and U.S. patent application Ser. No. 12/626,872, filed on Nov. 27, 2009, now U.S. Pat. No. 8,429,748, issued Apr. 23, 2013.

This application further relates to the Applicant's applications U.S. patent application Ser. No. 12/905,565, filed on Oct. 15, 2010, issued as U.S. Pat. No. 8,825,838: titled "Identification of business process application service groups"; U.S. patent application Ser. No. 12/905,688, filed on Oct. 15, 2010, issued as U.S. Pat. No. 8,938,489: titled "Monitoring system performance changes based on configuration modification"; U.S. patent application Ser. No. 12/905,761, filed on Oct. 15, 2010, issued as U.S. Pat. No. 8,656,009: titled "Indicating an impact of a change in state of a node"; U.S. patent application Ser. No. 12/905,850, filed on Oct. 15, 2010, issued as U.S. Pat. No. 9,426,024: titled "Establishing communication between enterprise nodes migrated to a public cloud and private enterprise infrastructure"; and U.S. patent application Ser. No. 12/905,879, filed on Oct. 15, 2010, issued as U.S. Pat. No. 8,156,378: titled "System and method for determination of the root cause of an overall failure of a business application service".

The entire contents of each of the above mentioned applications are specifically incorporated herein by reference.

FIELD OF THE INVENTION

Embodiments of the invention relate generally to network traffic analysis and, in particular, to methods and apparatus for automatic determining of service groups within a communications network.

BACKGROUND

Traditionally, Enterprise managers have had to choose which nodes of an Enterprise network they would consider to migrate to a cloud infrastructure. The nodes are most often members of the Virtual infrastructure. These nodes often work in concert with several other nodes to carry out a business process or function and thus it can be for a combination of nodes to be migrated together to perform the business process or function. The process of choosing which Enterprise nodes must be moved together is tedious and inefficient. It is manually achieved by the Enterprise manager who must take into account the Enterprise nodes reliance on key pieces of infrastructure, such as networks and storage.

BRIEF DESCRIPTION OF THE DRAWINGS

Reference will now be made, by way of example only, to specific embodiments and to the accompanying drawings in which.

DETAILED DESCRIPTION

Figure 1:
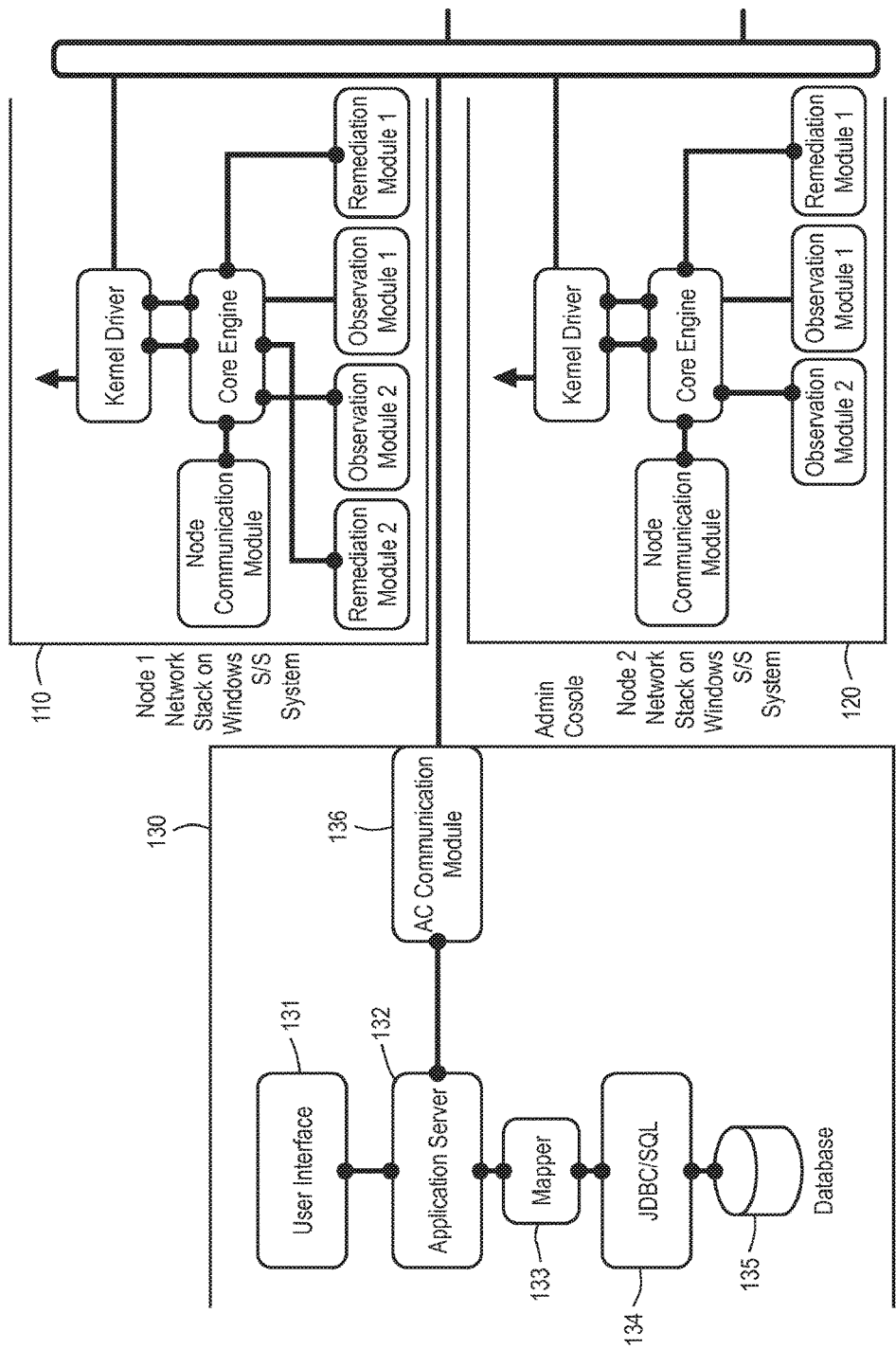
FIG. 1 illustrates an example of a high level component architecture usable in an embodiment of the invention.

Methods and systems for migration of one or more nodes of an enterprise to a cloud infrastructure are discussed herein. The system may include an administration console configured to determine a network ontology for at least one node of the enterprise network, the network ontology describing one or more nodes for which the indicated node has a communicates_with relationship. The administration console may also generate a migration group comprising a plurality of nodes of the network ontology and generate a migration configuration file for each node of the migration group.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

Modern enterprise networks are designed and architected for client/server computing, as well as peer to peer communication. A host computing machine may attach itself to a modern enterprise network and establish itself on the enterprise utilizing no more than a non-authenticated physical connection.

In one embodiment of the invention, a system and method by which software agents could be deployed to nodes within an enterprise network. The agents were used to determine collaborative relationships between the nodes. Various embodiments of the agent and an exemplary process for installing it are described in the following subsections. Further details of the agents are provided in the above referenced patent applications.

The agent could be remotely distributed from a single hardware platform to one or more nodes within an enterprise network. The agent could be installed in stages and each stage can be selected with the characteristics of that node in mind. The configuration at any given node could comprise an observation functionality, an analysis functionality, a reporting functionality, a remediation functionality or some subset of those functionalities.

FIG. 1 illustrates an example of a high level component architecture usable with an embodiment of the present invention. In this exemplary arrangement there are two network nodes 110 and 120 shown, although the number of network nodes is not intended to be limited to two. These nodes include physical hosts, virtual machines, network devices, storage devices, and other nodes that provide a similar function. Additionally, while the network nodes are shown to be similar, they may be very different without affecting the use of the invention. The network nodes are coupled for data communication flow via a data transmission medium. The transmission medium could be wired, wireless, or some combination thereof and its type is not relevant to practicing the invention. In this embodiment, another computer platform 130 can be in communication with the network nodes via the data transmission medium. In this example, that platform is called an administration console (AC).

The platform or AC 130 has at least the following elements: a user interface 131, an application server 132, a mapper 133, JDBC/SQL 134, database 135 and AC communication module 136. JDBC is an API for the Java programming language that defines how a client may access a database. JDBC is oriented towards relational databases and provides methods for querying and updating data in a database. SQL, referred to as Structured Query Language, is a database computer language designed for managing data in relational database management systems (RDBMS). The AC 130 propagates an agent, described in more detail below, to the various network nodes via the data transmission medium. The agent may be propagated and instantiated in stages so as to first cause a receiving network node to install the core aspect or core engine of the agent prior to instantiating other modules of the agent. The installation may be designed to be transparent to the user, with the core engine being hooked into the stack of the operating system of the node. This installation thus yields the disposition of the core engine and stealth kernel driver as shown in each of nodes 110 and 120.

Once the core engine component is installed, the AC 130 may send a communication module component that enables data traffic to be conveyed or communicated to and/or from that network node. These components are shown as the node communication modules in each of nodes 110 and 120. Collectively, the core engine, the node communication module, and the additional modules described below comprise a set of functional modules.

Once the node communication module is installed, the AC can forward one or more additional agent modules to the node. Examples of types of modules will be described below. Each such module can be designed to receive data packets intercepted between an adapter driver and a protocol layer of the node's operating system and then analyze the data packets to determine whether they are indicative of some activity or behavior of interest.

In one embodiment, the user interface of the AC will present a security dashboard to an operator. The dashboard will facilitate operator actions intended to remotely install, execute, report on and manage the state of the enterprise from a single geographic location. In one embodiment, an enterprise IT infrastructure environment, including networks of computer entities consisting of physical and/or virtual machines located at network nodes, may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Advantageously, data relating to actual connections may be acquired automatically in near real time. For example, an actual connection may be monitored in an interrupt-driven way while collecting information regarding an application that made the connection. Moreover a "volume for the connections" may be derived.

A software based data collection agent may be received by a computing device at a node within a communications network. The agent may be distributed to one or more nodes from a central node, e.g. the administration console 130, via the network. Once the software based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be such that it is transparent to, or undetected by a user of the node. The installed data collection agent may monitor data packet traffic between an adaptive driver layer and a protocol layer and report results of the monitoring to the central node.

In one example, the data collection agent may have an interface to an operating system's network stack and may periodically determine what applications are using the network stack. Thereby the data collection agent may track information regarding a network connection, the connection duration, and any applications and systems involved in the connection. Moreover, the data collection agent may normalize the foregoing information and report it to an administration console so that different operating systems may be correlated by the administration console.

As a further example, the data collection agent may include a network filter inserted into the network stack to determine exactly when a connection is made between entities. The filter component of the data collection agent may be inserted at one or more layers of the OSI model. For example a data collection agent may have filter interface at the transport layer and/or a filter interface at the network layer. Thereby, the data collection agent may track information regarding a network connection, the connection duration, and any applications and systems involved in the connection. Moreover, the data collection agent may normalize the foregoing information and report it to the administration console so that different operating systems may be correlated by the administration console.

As a yet further example, the data collection agent described in the preceding paragraph may also include a packet filter inserted into the network stack to track connection data. For example, a data collection agent may have a filter interface at the data link layer. Then, the data collection agent may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the administration console so that different operating systems may be correlated by the administration console.

Figure 2:
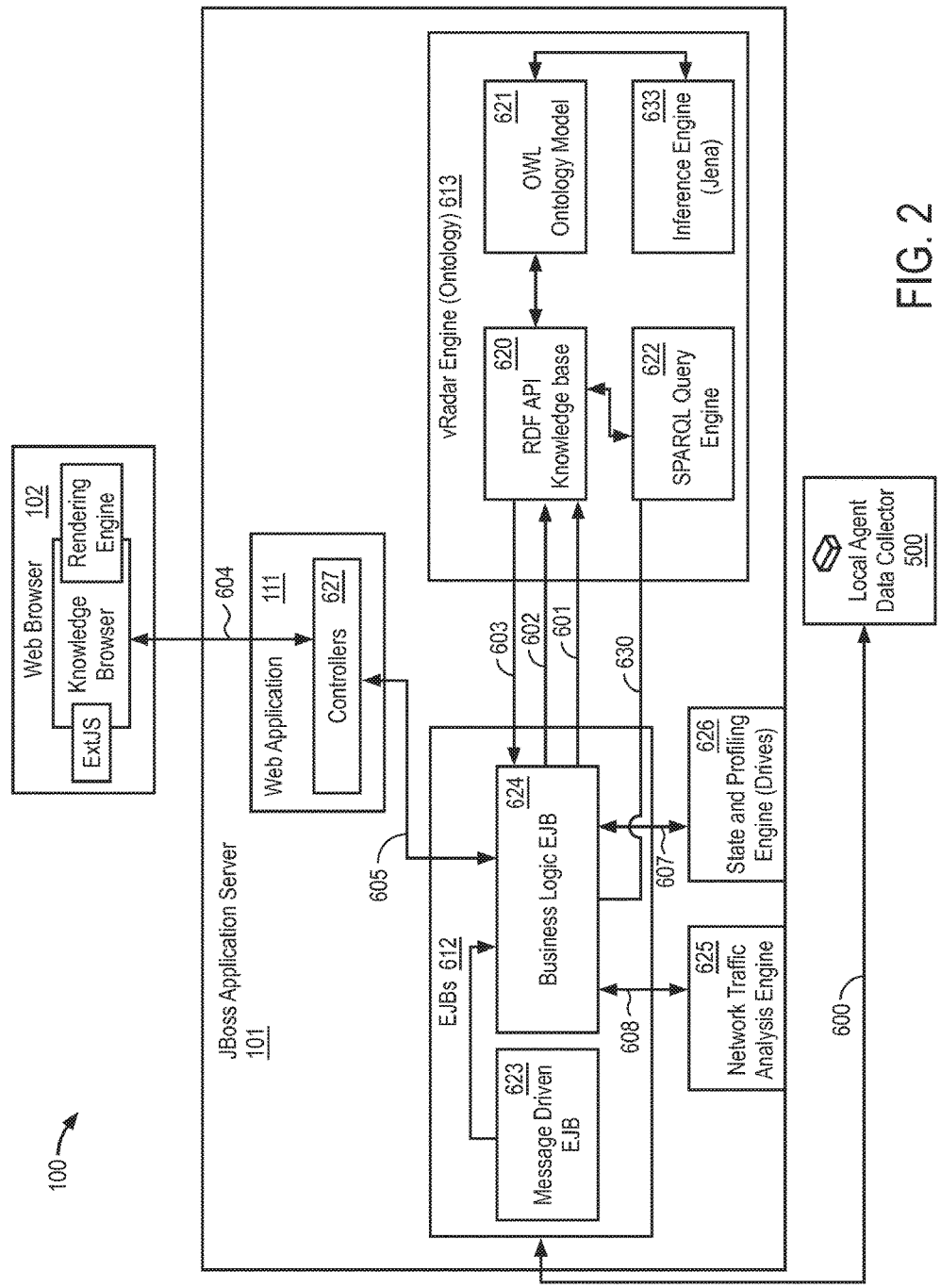
FIG. 2 is an illustrative embodiment of enterprise network including an administration console.

Referring now to FIG. 2, an illustrative system 100 for deploying data collection agents onto network nodes, monitoring network connections instantiated at each network node, acquiring resulting data, automatically creating an ontological description of the network from the acquired data; and dynamically updating the ontological description will be described. The system 100 may further be used for automatically identifying Business Process Application Service Groups within an enterprise network as will be described in more detail below. In an embodiment, elements of system 100 utilize the Java software platform and Enterprise Java Bean (EJB) architecture to provide certain functionality, and these well-known terms may be used in the description that follows. Other software platforms and architectures, providing similar functionality may be used without departing from the scope of the present invention. This may be accomplished with JBoss, J2EE EJB, as well as .Net architectures.

System 100 may comprise an application server 101, which interacts across a network with a number of data collection agents 500 deployed in various nodes of the network. Advantageously, application server 101, may be an element of the administrative console (AC) 130 (FIG. 1) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB 623 may initially inspect a received message. A received message relating to network traffic or node status may be forwarded by message driven EJB 623 to the Business Logic EJB 624. Business Logic EJB 624 may call Network Traffic Analysis Engine 625 for messages relating to network traffic. Alternately, "infrastructure messages" (i.e., those relating to node status) may be forwarded directly to the State and Profiling Engine 626.

Messages forwarded to the state and profiling engine 626 may there undergo sorting and processing. The state and profiling engine 626, for example, may identify the entities within the IT Infrastructure as well as their dependency on one another, based on messages received from the platform. In addition, state and profiling engine 626 may perform further processing to determine the state of one or more entities. State may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

A data output from state and profile engine 626 may be sent via signal flow paths 607 and 601 to ontological description creation engine 613. Initially, the data may be handled by Resource Description Framework (RDF) API knowledge base 620 where the data is categorized and stored utilizing a predefined entity relationship, determined by the Web Ontology Language (OWL) API 621. OWL is a family of knowledge representation languages for authoring ontologies which are a formal representation of the knowledge by a set of concepts within a domain and the relationships between those concepts. Ontologies are used to reason about the properties of that domain, and may be used to describe the domain.

Messages handled by the Network Traffic Analysis Engine 625 may include source-to-destination data, qualified by a communicating application within the operating system of the originating node, as well as frequency of communication information. This data is analyzed by processing the number and type of connections to determine if an ontological "communicates_with" relationship exists. A determination may be made by tracking the number of connections of a specific application over a period of time. The period of time may be a system default time or may be preselected, for example, by the system administrator. Importantly, by analyzing such data as source-to-destination data, "communicates_with" relationships can be revealed between two or more nodes even where there is no direct architectural relationship between those nodes.

The system automatically creates a service group for any ontology with a "communicates_with" relationship. The inference is also automatic and performed by the SPARQL engine. This is instantiated by a user request to search for like service groups. Messages handled by the Network Traffic Analysis Engine 625 may include source-to-destination data, qualified by a communicating application within the operating system of the originating node, as well as frequency of communication information. This data is analyzed by processing the number and type of connections to determine if an ontological "communicates_with" relationship exists. A determination may be made by tracking the number of connections of a specific application over a default period of time.

A data output from network traffic analysis engine 625 may be sent via signal flow paths 608 and 602 to ontological description creation engine 613. Initially, the data may be handled by RDF API Knowledge base 620 where the data is categorized and stored utilizing a predefined entity relationship, determined by an OWL API 621. For example, the OWL API 621 may define what entity classes exist, their possible relationship to each other, and their possible state.

Figure 3:
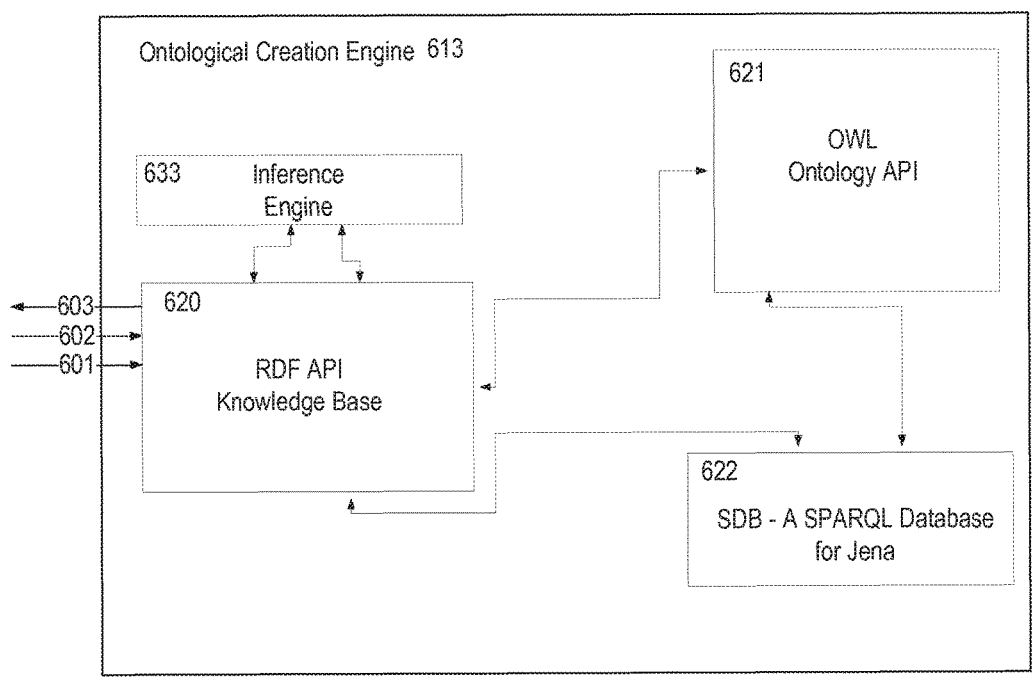
FIG. 3 is an illustrative embodiment of an ontological creation engine.

Referring now to FIG. 3, as data is received by RDF API Knowledge Base 620, logic in the RDF API Knowledge Base 620 may map the incoming data to the appropriate ontological classes and relationships defined by OWL Ontology API 621. Once the correct classes and relationships are chosen, the entity and relationship information may be entered into RDF API Knowledge Base 620. The knowledge base may also be forwarded to SPARQL database and query language SPARQL Database for Jena 622 for later inference processing by inference engine 633. Other examples include inferences which ontological entities will achieve an undesired state by inferring like entities have already achieved an undesired state. The inference engine may also be employed to infer potential ontological relationships among like ontology class structures (i.e., if "VM-A has storage-A", then VM-B which is like VM-A may also be able to have storage-A for storage. Inference engine 633 may determine inferred relationships based on the ontology model contained in OWL Ontology API 621.

Figure 4:
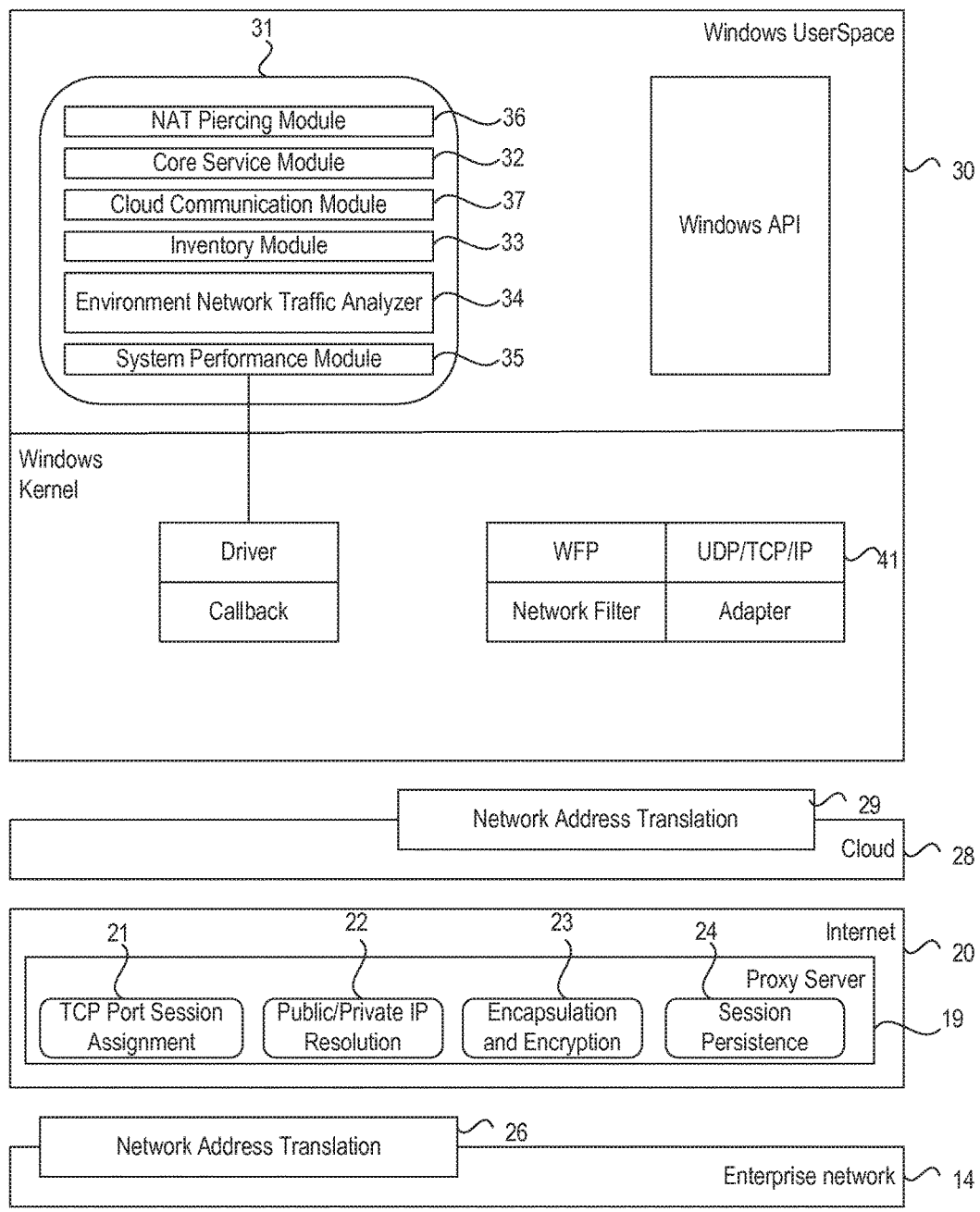
FIG. 4 an enterprise network with a cloud computing environment.

The enterprise nodes of the system 100 may be comprised of nodes within a local area network, remote nodes and nodes within a cloud infrastructure that communicate with the enterprise network on an internet connection via a proxy server. An embodiment of the network structure is depicted in FIG. 4. The proxy server 19 sits within the internet space 20 and includes modules for TCP Port Session Assignment 21, Public/Private IP Resolution 22, Encapsulation and Encryption 23 and Session Persistence 24. The proxy server 19 resides on the outside of the Enterprise's DMZ or perimeter network, which allows for connections from both the Admin Console and a remote agent in a public Cloud. The proxy server provides a node specific split tunnel to both sides of the proxy server.

The enterprise network 14 may include a Network Address Translation module 26 that provides network address translating functions for all inbound and outbound internet communications with the entities within the enterprise network 14. The enterprise network 14 further comprises an application server including an administration console as described above. The application server communicates with agents on a plurality of physical and virtual machines within the enterprise network as well as communicating with nodes provided within a cloud infrastructure.

The cloud infrastructure 28 may also include a NAT module 29 for controlling internet communications to nodes within the cloud 28.

From time to time, it can be desirable or necessary to migrate virtual machine nodes and/or groups of nodes within the enterprise network to a computing cloud and/or to migrate nodes already within the cloud. Ordinarily, an Enterprise manager would use the network architecture to manually determine nodes to migrate to a cloud infrastructure. The network architecture describes only direct relationships between nodes. A problem with this approach is that it cannot account for indirect communication relationships. In the method of the present disclosure, a network ontology that includes indirect communications relationships is used to determine the most suitable nodes for migration to the cloud.

The Agent system and the Ontological description of the network may be used to assist administrators in migrating one or more virtual machine nodes or service groups of nodes to, or within, a Private or Public cloud while maintaining or exceeding the service group's service level. The system may provide a complete accounting of the selected Service group (dependencies, communication relationships, & Service Tiers) to facilitate its migration to the cloud infrastructure.

Figure 5:
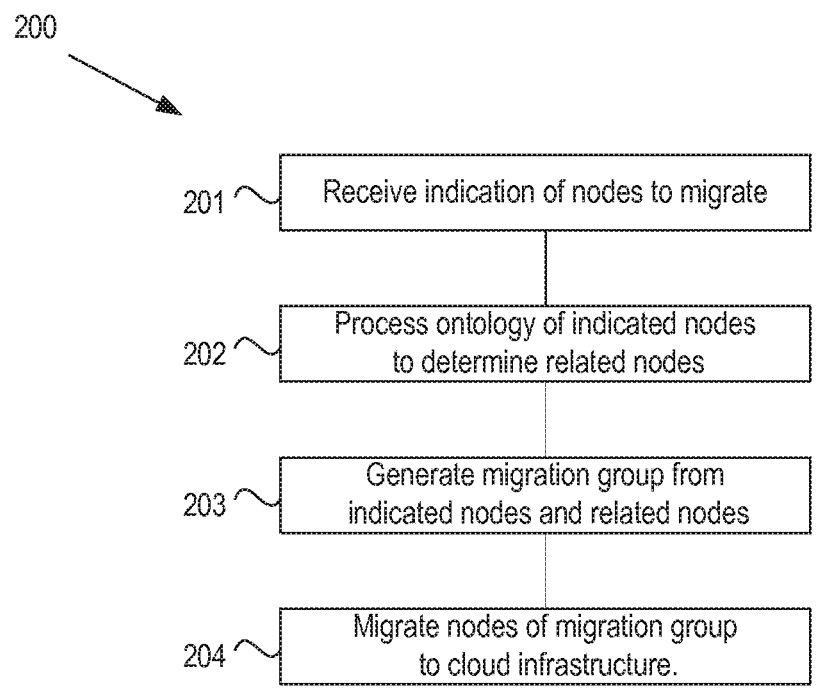
FIG. 5 illustrates a flow diagram of one embodiment of a method for migrating nodes of the enterprise network to the cloud infrastructure.

An exemplary method for migrating one or more nodes to the cloud may be performed by the Jena engine 622 and is discussed in more detail in conjunction with FIG. 5. The method of FIG. 5 is performed by processing logic that may comprise hardware (circuitry, dedicated logic, etc.), software (such as is run on a general purpose computer system or a dedicated machine), or a combination of both.

Referring to FIG. 5, at block 201, at least one node to migrate is indicated. The indication of the at least one node may be an automatic determination, as described above, or may be indicated by a user. The indication may also be made by a user selecting nodes that have been automatically recommended by the system. At block 202, a network ontology is determined for the indicated nodes which allows the indicated node and at least one node of the network ontology for the indicated node to be added to a migration group (block 203). At block 204, each node of the migration group is migrated to the cloud infrastructure.

Figure 6:
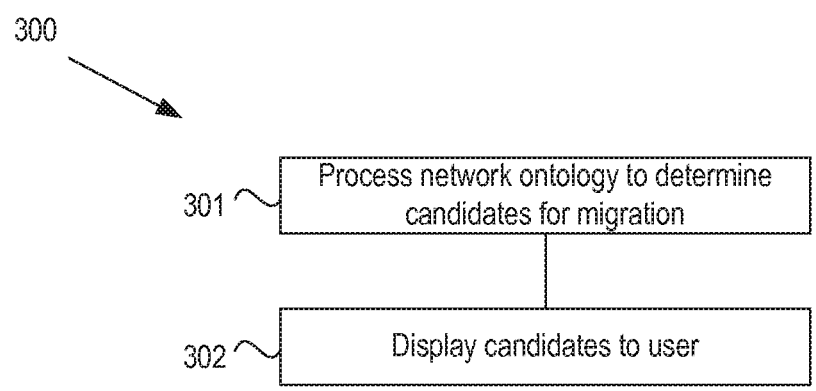
FIG. 6 illustrates a flow diagram of one embodiment of a method for determining nodes for migration.

An exemplary method for determining nodes to migrate may be performed by the Jena engine 622 and is depicted in FIG. 6. The method of FIG. 6 is performed by processing logic that may comprise hardware (circuitry, dedicated logic, etc.), software (such as is run on a general purpose computer system or a dedicated machine), or a combination of both.

Referring to FIG. 6, at block 301, the network ontology is processed to determine one or more candidates for migration. The candidates for migration are displayed to a user (block 302) to allow the user to confirm the nodes, add additional nodes to a migration group or remove suggested nodes from a migration group.

In one embodiment, the candidates for migration are virtual machines of the enterprise network. The virtual machines may be ranked by one or more performance parameters. The virtual machines may also be ranked by a virtual machine state.

In one embodiment, the candidates for migration are nodes that make up a Business Application Service Group. A user may define a business process application service group by indicating a primary application including one or more executables of the primary application that are executed on a particular virtual machine. The system can then determine the business application service group for that primary application by determining all of the communicates_with relationships for that primary application, such as the source-to-destination communications of the executables.

In one embodiment, SPARQL Engine provides a list of candidate service groups for cloud migration by parsing the service group ontologies for service groups that are comprised entirely of virtual machines, or alternatively, service groups that are comprised of virtual machines and physical machines that can be converted to virtual machines.

In one embodiment, the SPARQL Engine provides a list of Candidate node, Service Group, or business application service groups by utilizing Network Device threshold settings and state information. A node, Service Group, or BASG that has remained in a Normal State while the Network Device that provides a dependency on the node has been unreliable, e.g. has achieved more than 5 High Warning State indications in a 24 hour period, is provided as a candidate(s) for migration.

In one embodiment, the SPARQL Engine provides a list of Candidate nodes, Service Group, or BASG by utilizing Configuration Drift state information of the component nodes of a Service Group or BASG. A node that has not achieved a Configuration Drift state change over a predetermined period, such as the last 30 days, makes the component node an ideal candidate for migration.

While distinct methods for determining candidates for migration have been described, a person skilled in the art will understand that a combination of these methods may be simultaneously employed.

In addition, while automatic recommendations can be provided to the user, the user may also be able to make manually formed migration groups. Using the web application 111, an inventory list of nodes may be displayed to the user as shown in an inventory view 70 of FIG. 7. The inventory list 71 allows a user to select automatically recommended migration groups as well as select individual nodes 72. Using this inventory screen, a user may define a guest by selecting nodes in the inventory screen. Selected nodes may be assigned to a migration group, for example by selecting a "migration" option which may be selected as a right mouse click operation or from an Assign menu 73. In one embodiment, the user may select a single virtual machine for migration. When selected, the system will then send the virtual machine identity as a query to the RDF knowledge base 620 to retrieve an ontology for the virtual machine. The ontology indicates the service groups which the virtual machine is a member of. That is, the service group is the group of nodes for which the virtual machine has a communicates_with relationship. The ontology for the virtual machine may be displayed in a virtual machine summary view, an example of which is depicted in FIG. 8. The virtual machine summary view 80 shows various parameters of the selected virtual machine, including configuration 81, relationships 82, health 83 and properties 84. A current state 85 of the virtual machine can also be displayed. Migration parameters for the virtual machine can also be displayed 86. The migration parameters include that the selected Virtual Machine is a migratable component of the "Exchange" business application. Other migratable components of the business application are also listed 88. These components are derived from the ontology 89 and will typically be the virtual machines that are members of the particular business application.

In an alternative embodiment, the interface may allow the user to directly select the service group, rather than a specific member or virtual machine within the service group.

In a further alternative embodiment, the system may allow a user to define a primary application including one or more executables of the primary application. The system can determine source-to-destination relationships for those executables to determine all of the nodes that relate to the primary application. An example of a primary application is an email service, or similar business process application. The nodes that have a communicates_with relationship with the primary application are considered to form a Business Process Application Service Group. A Business Process Application Service Group can be defined by the user, e.g. by indicating the primary application. Alternatively, a Business Process Application Service Group can be automatically detected by the system as described above.

The identification of service groups, either directly or indirectly, allows the user to conveniently and efficiently determine how nodes are related to each other so that all nodes that have to be migrated to the cloud structure or infrastructure can be readily identified.

Once the nodes to be migrated have been identified, migration agents are configured for each node of the migration group. Configuration includes deploying an agent to the node, including updating an existing agent, and establishing communications between the node and the enterprise network. The node with the updated agent is then migrated to a cloud infrastructure and the agent re-establishes communication between the migrated node and the enterprise network. Once the migration agents have been configured, migration of the migration group can then be performed.

Figure 9:
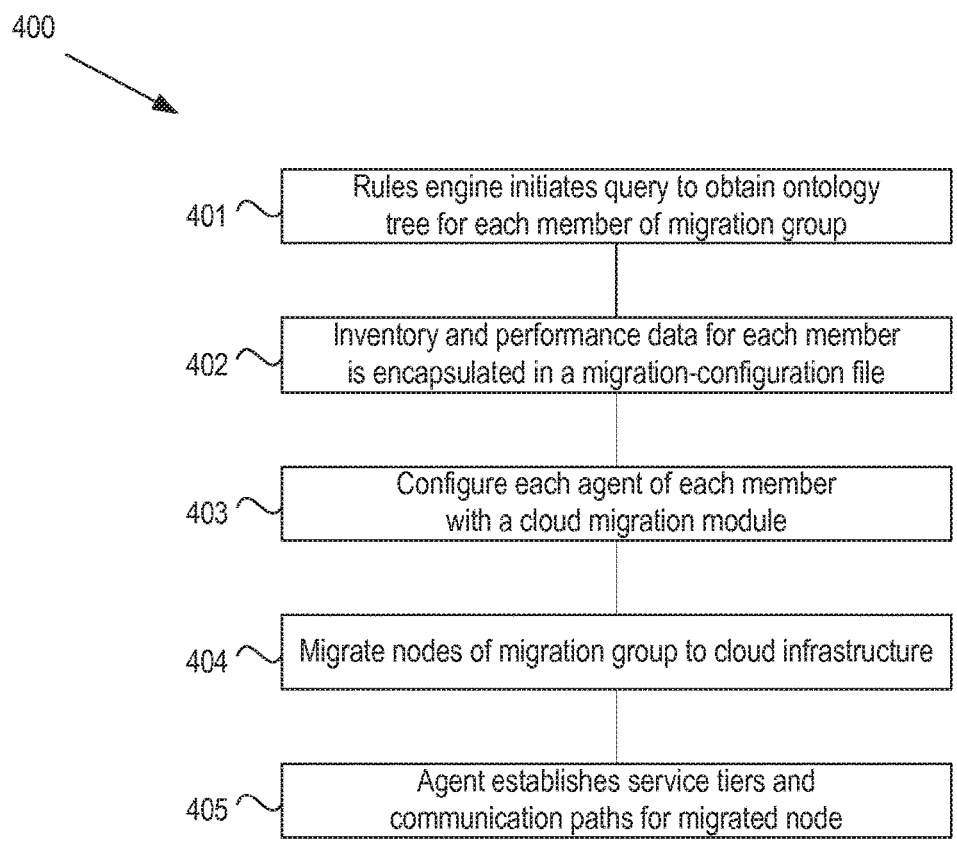
FIG. 9 illustrates a flow diagram of one embodiment of a method for migration.

When the user selects a migration option for the selected group of nodes, the Rules Engine 626 executes a predefined migration routine, depicted by FIG. 9 in accordance with one embodiment of the invention. The method of FIG. 9 is performed by processing logic that may comprise hardware (circuitry, dedicated logic, etc.), software (such as is run on a general purpose computer system or a dedicated machine), or a combination of both.

Referring to FIG. 9, at block 401, the rules engine initiates a query to the Inference engine 633 to obtain the ontology tree that covers each member of the migration group. The tree members are listed and the Inventory and performance data for each of these tree members is encapsulated in a migration-configuration file (block 402). The migration-configuration file defines all of the features of the node that allow the node to be instantiated in the cloud infrastructure. An example of the migration-configuration file for a node may be as follows:

```
.encoding = "windows-1252"
.EnableCloudModules=True
config.version = "8"
virtualHW.version = "7"
memsize = "2928"
MemAllowAutoScaleDown = "FALSE"
displayName = "VSM BETA Update2"
guestOS = "linux"
numvcpus = "2"
ethernet0.present = "TRUE"
ethernet0.addressType = "generated"
ethernet0.connectionType = "custom"
ethernet0.startConnected = "TRUE"
ide1:0.present = "TRUE"
ide1:0.autodetect = "TRUE"
ide1:0.filename = "auto detect"
ide1:0.deviceType = "cdrom-raw"
scsi0.present = "TRUE"
scsi0.virtualDev = "Isilogic"
scsi0:0.present = "TRUE"
scsi0:0.fileName = "VSM BETA Update2.vmdk"
Isilogic.noDriver = "FALSE"
pciBridge0.present = "TRUE"
tools.upgrade.policy = "useGlobal"
pciBridge4.present = "TRUE"
```

-continued

```
pciBridge4.virtualDev = "pcieRootPort"
pciBridge5.present = "TRUE"
pciBridge5.virtualDev = "pcieRootPort"
pciBridge6.present = "TRUE"
pciBridge6.virtualDev = "pcieRootPort"
pciBridge7.present = "TRUE"
pciBridge7.virtualDev = "pcieRootPort"
extendedConfigFile = "VSM BETA Update2.vmxf"
virtualHW.productCompatibility = "hosted"
ethernet0.generatedAddress = "00:0c:29:30:16:8d"
tools.syncTime = "TRUE"
uuid.location = "56 4d 32 f6 a1 dc 92 30-be 9c 27 e0 d2 30 16 8d"
uuid.bios = "56 4d 32 f6 a1 dc 92 30-be 9c 27 e0 d2 30 16 8d"
cleanShutdown = "FALSE"
replay.supported = "FALSE"
replay.filename = ""
scsi0:0.redo = ""
pciBridge0.pciSlotNumber = "17"
pciBridge4.pciSlotNumber = "21"
pciBridge5.pciSlotNumber = "22"
pciBridge6.pciSlotNumber = "23"
pciBridge7.pciSlotNumber = "24"
scsi0.pciSlotNumber = "16"
ethernet0.pciSlotNumber = "32"
vmotion.checkpointFBSize = "16777216"
ethernet0.generatedAddressOffset = "0"
ethernet0.vnet = "VMnet8"
checkpoint.vmState = ""
debugStub.linuxOffsets =
"0x0,0xffffffff,0x0,0x0,0x0,0x0,0x0,0x0,0x0,0x0,0x0,0x0,0x0,0x0"
.proxyaddress=204.202.32.21:8080
.localdependency=192.168.1.52:4060
.localdependency=192.168.1.5:4060
.localdependency=192.168.1.2:4060
.localdependency=192.168.1.23:4060
.localdependency=192.168.1.21:4060
.localPrimaryapplicatonExecutable=SQLSERVR.EXE[192.168.1.52|192.168.1.21
]
.localAC=none
.externalAC=10.173.0.20
.externaldependencies=F.Applications
.externaldependencies=F.Web1
.externaldependencies=F.10.173.0.33
.externaldependencies=F.NAMAIN1
.externaldependencies=F.Applications
.externaldependencies=F.Web1
.externaldependencies=F.10.173.0.33
```

Each agent within a member of the migration group is configured with a cloud migration module (block 403). In one embodiment, the software agents described previously may be pre-configured with a cloud migration module that is initially inactive or disabled. In the above example, setting the ".EnableCloudModules" field to a value of "TRUE", activates the cloud migration module for that agent. In an alternative embodiment, a specific cloud migration agent may be sent to each node that is to be migrated.

The agent is provided with the network configuration information, including communications relationships, derived from the ontology as well as service tier configuration information. At block 404 the node/s is/are migrated to the relevant cloud infrastructure. The "migration-configuration" file is received by the cloud infrastructure and used to instantiate the migrated nodes within the computing cloud, including assigning CPU and memory, installing applications, and determining service level agreements. The service tier indicated in the migration-configuration file provides a summary of the service requirements of the nodes and may be used for generating a service level agreement (SLA) with the private of public computing cloud provider.

In one embodiment, migration may be accomplished by the system "Cloning" the Virtual Images of all Virtual Machines in a migration Group. The cloned Virtual Machines may be presented to the user in the formats that are in the data store within the Virtual Infrastructure. For example, rhe cloned Virtual Machines may be stored in a Virtual machine Disk (VMDK), Virtual Desktop Infrastructure (VDI), or one of several standard Virtual Machine file formats. For example, if the Virtual machines on the Data store are VMWARE ESX infrastructure VMs, they will be gathered by the AC web server Agent and stored as "VMDK files with associated "VMX" updated configurations. The names of the VMs may be changed to their enterprise node names. These files are transported to the user via the Web browser "save as" function where the user will archive them and send them to the cloud infrastructure via whatever mechanism is provided by the cloud provider.

At block 405, the agent, after migration, processes the migration configuration file to establish service tiers within the cloud infrastructure and to re-establish communication paths with any migrated and non-migrated nodes that the node previously had communication relationships with. Connections to migrated nodes may be achieved by the Agent setting the external dependencies based on data from the Virtual Machine's migration-configuration file. The Agent sends a registration to the external dependency nodes listed in the migration-configuration file and a connection is complete once registration has occurred. Similarly, connections to non-migrated nodes may be performed by the agent by setting the local dependencies.

After migration, the Rules Engine 626 communicates with a local Master Agent to send outbound messages to the migrated VM Agents requesting those agents respond. The Rules Engine 626 listens for incoming messages on a series of local TCP/IP Sockets that confirm that the migrated agents are active and communicating utilizing the pre-configured network configuration.

As described above, in one embodiment, nodes can be selected for migration based on performance data. An EJB is created to gather the nodes and node dependency on the infrastructure to assemble Cloud Migration Service Groups. The EJB is sent to the state and profiling engine that formulates a query to the database of all known Enterprise nodes in inventory. The Inventory list is sent as a query to the SPARQL Engine and the SPARQL Engine gathers all node relationship data from the knowledge base contained in the RDF Framework.

The node relationships may be contained as Generic Service Groups in both categorized and un-categorized form. Performance metrics for the Service groups is retrieved from the state and profiling engine 626. The Service groups are then ranked based on their performance level. Performance metrics may include CPU usage, memory utilization, disk utilization, network utilization. Other suitable parameters will be apparent to a person skilled in the art. The elements are correlated and a ranked list of service groups are provided to the user with a list of dependent key infrastructure elements required for the service groups to perform their business process or function.

From this ranked list, the user is able to view the information that allows the user to decide the Service Groups that are most important to be migrated. In one embodiment, the ranking may include state, with high alert states being shown as strong migration candidates. The migration of service groups that have a high alert state to the computing cloud means that these service groups can continue to operate in a less stressed computing environment. For example, a memory alert can be relieved by allocating more memory to the service group in the computing cloud environment.

Figure 7:
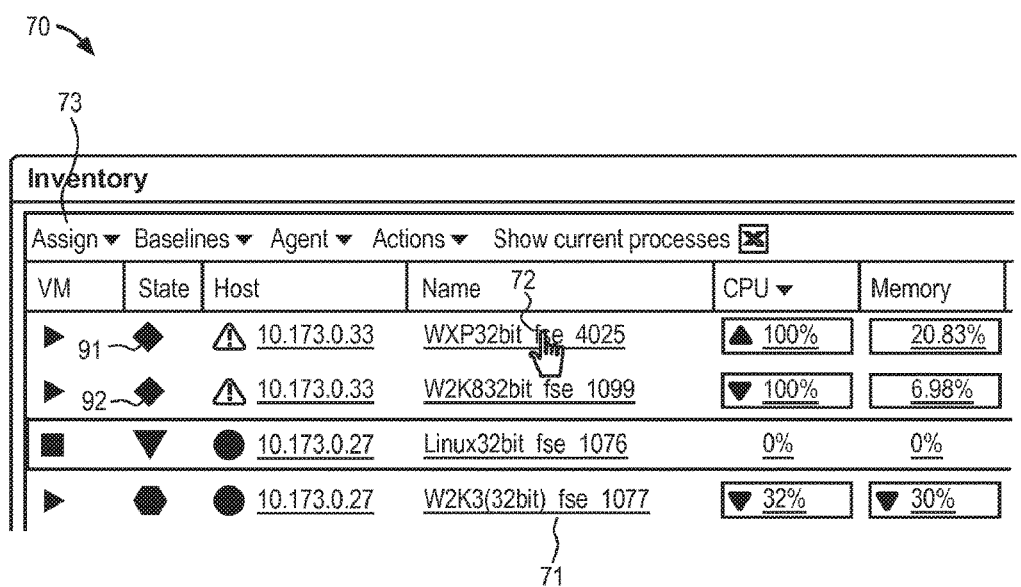
FIG. 7 illustrates an inventory view.
Figure 8:
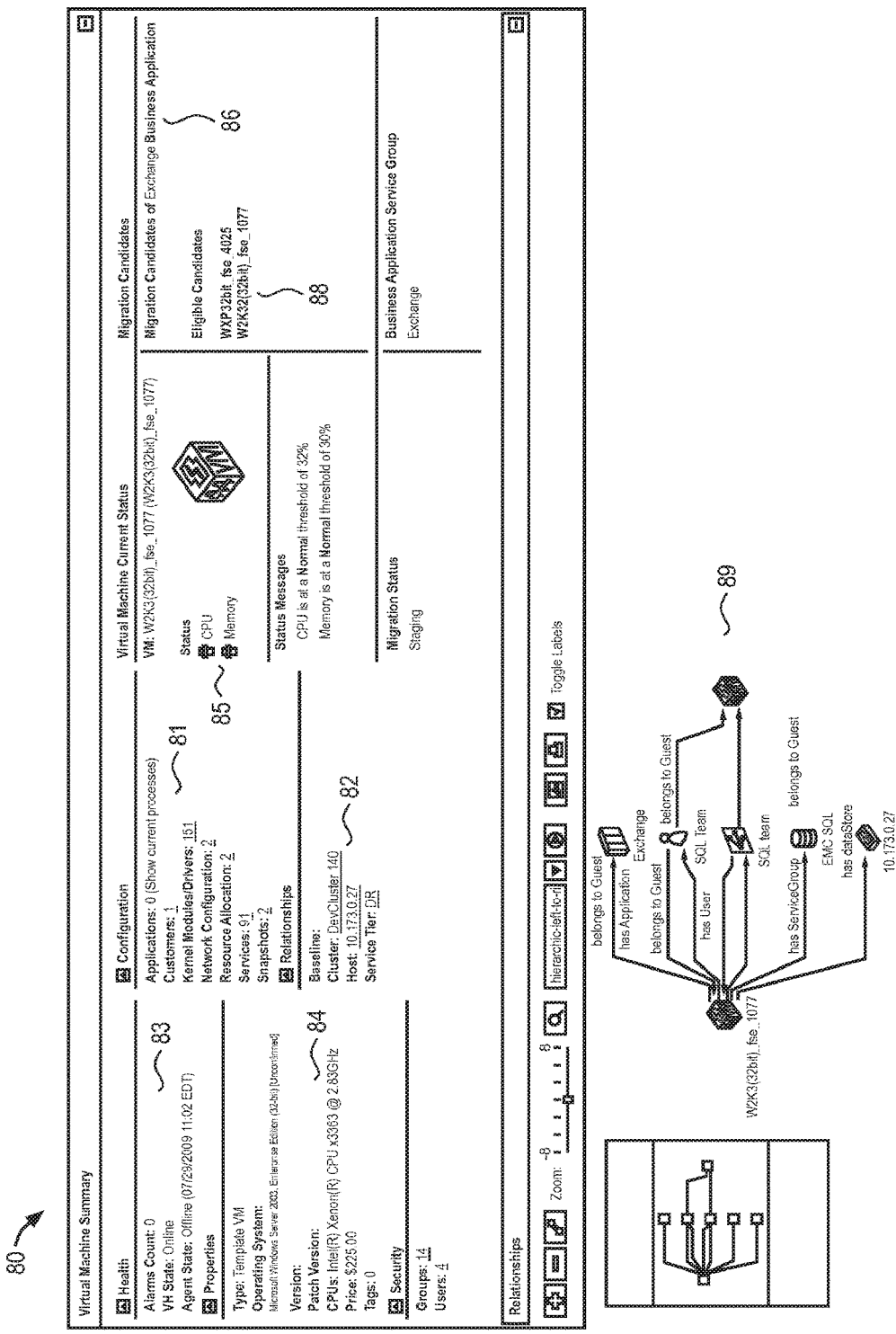
FIG. 8 illustrates a virtual machine summary view.

In the Inventory View example 70 of FIG. 7, the highest listed VMs each have a high alert state. VM 91 has a high alert state (red diamond) because its CPU is operating at 100% and its disk allocation is also at 100%. VM 92, which operates on the same host, also has a high alert state, which is due to its CPU usage being at 100%. These two VMs would be strong candidates for migration to the computing cloud, where additional resources could be allocated to the functions of these VMs. By selecting the hyperlinks in the Inventory View, the user is able to view the VM Summary view described above with reference to FIG. 8, which enables the user to view the ontology of the selected VM and therefore any related migration candidates.

The above described interfaces provide an easy cloud migration tool by allowing a user to select the nodes to be migrated, after which the system takes care of migrating the nodes, re-establishing communication relationships between migrated nodes and non-migrated nodes, configuring service level agreements with the cloud, etc. In addition, performance monitoring tools can be provided to the migrated VMs to ensure that performance of the VM is maintained after migration. The selection of the nodes to be migrated is enhanced by presenting the user with a list of nodes ranked by their current performance metrics.

To facilitate the migration of the nodes and/or Service groups, the software agent may be provided with modules for VM performance, identification, & allocation Information. These modules may then be used to reconfigure the network configurations of the migrated VMs to re-establish storage, peer, and admin console communication.

The VM Performance Module instructs the Agent to monitor the performance of a migrated Virtual Machine by obtaining performance metrics from the Virtual Machine's 0/S through standard O/S APIs. The identification and allocation information is gathered by the module accessing the system registry. Allocation information is information of the Virtual Machine Inventory and may include:

Applications;
Services;
Users;
Groups;
Network Devices;
Local Disk volumes;
OS version and patch level;
Peripheral devices; and
Network connections and traffic analysis.

This information is used to inform the user as to the health of a VM once migrated to determine if the Virtual Machine is still viable. The user may be notified using configuration baseline drift alerts. Configuration drift alerts can be determined by comparing a current configuration to the previously generated configuration for that node. Where differences in the configuration are reported, a configuration drift alert that details those differences is generated. The alert may include a Node ID and a time at which the configuration change was detected. In one embodiment, the configuration drift alert details a configuration change relative to the last reported configuration, rather than relative to the assigned baseline, so that changes in the performance of the system can be directly correlated with the specific configuration changes that caused the performance to be affected. In an alternative embodiment, the configuration drift alert may show changes between the current configuration and the assigned baseline. The configuration drift alert may be generated only the first time that a particular variation from the baseline is detected. This prevents an alert from being generated every time the configuration is reported by the agent at the node while the particular variation persists.

The configuration drifts can be detected at the administration console by analyzing the configuration messages that are periodically received from the agents deployed at the nodes. The administration console may then generate various visualizations that allow a user to determine if the root cause of a system performance change resulted from an application or configuration change. Further the system may indicate what impact these changes have on a group of nodes that perform a specific business process. For example, the impact of a change may be manifested in a resulting change in service tier threshold indicators for cpu, memory, storage, network and uptime. A change in configuration that has a resulting increase in demand on a given node may result in a manifested change in the nodes uptime to the overall business application.

Figure 10:
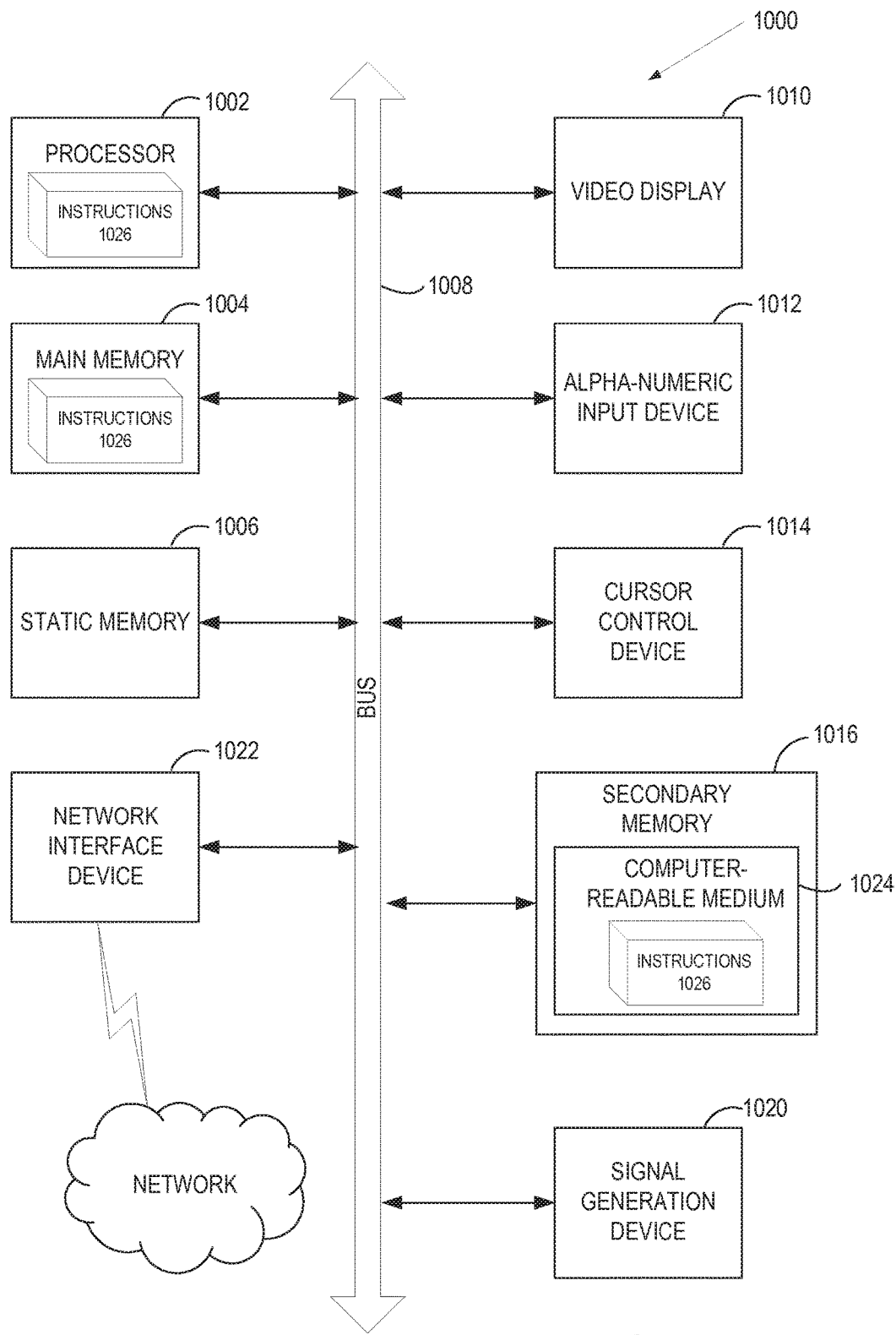
FIG. 10 is a block diagram of an exemplary computer system that may perform one or more of the operations described herein.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

The machine-readable storage medium 1024 may also be used to store software performing the operations discussed herein, and/or a software library containing methods that call this software. While the machine-readable storage medium 1024 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving an indication of at least one node of a plurality of nodes to migrate from an enterprise network to a cloud computing infrastructure, the indicated node comprising a first virtual machine;
identifying, by a processing device, one or more related nodes of the plurality of nodes that have direct and indirect communication relationships with the indicated node, the related nodes comprising a second virtual machine;
adding the indicated node and at least one node of the related nodes for the indicated node to a migration group;
preparing a migration-configuration file for each node of the migration group, the migration-configuration file comprising service level agreement (SLA) information;
deploying a migration agent to each node of the migration group; and
migrating the migration group to the cloud computing infrastructure, wherein each node of the migration group is migrated using a corresponding migration-configuration file to generate an SLA for each node of the migration group with a provider of the cloud computing infrastructure in view of SLA information from the corresponding migration configuration file.

2. The method of claim 1 wherein the one or more related nodes are identified in view of a network ontology for the indicated node, the network ontology being created for the indicated node using a data collection agent deployed to the indicated node, the network ontology describing current state of the indicated node and the related nodes.

3. The method of claim 1 wherein the SLA information in the migration-configuration file specifies a service tier for the respective node.

4. The method of claim 1 wherein the migration-configuration file specifies a network configuration to other nodes of the migration group.

5. The method of claim 2 wherein the migration-configuration file specifies a network configuration to non-migrated members of the network ontology of the indicated node.

6. The method of claim 1 further comprising providing the migration-configuration file to a cloud migration module of the migration agent at the node.

7. The method of claim 2 further comprising determining migratable components of the ontology of the indicated node.

8. The method of claim 2 further comprising distributing instances of the data collection agent to the plurality of nodes, wherein an instance of the data collection agent is to monitor data packet traffic between an adaptive layer and a protocol layer of a corresponding node, and to report results of the monitoring to a central node.

9. The method of claim 2 wherein the data collection agent comprises a network filter component inserted into a network stack to detect a connection made between entities.

10. The method of claim 2 further comprising:
determining whether an ontological communicates—with relationship exists between the indicated node and a related node of the one or more related nodes by tracking a number of connections of an application hosted by the indicated node.

11. The method of claim 2 wherein the current state of the indicated node and the related nodes in the network ontology is updated using an inference engine that makes inferences using similar nodes of the plurality of nodes.

12. The method of claim 1 wherein the indication of the at least one node is provided automatically or by a user.

13. The method of claim 1 wherein the migration group is migrated to the cloud computing infrastructure using a migration routine.

14. The method of claim 1 wherein the migration-configuration file comprises an ontology tree covering each node of the migration group.

15. The method of claim 1 wherein migrating the migration group to the cloud computing infrastructure comprises cloning a virtual image of each virtual machine being represented by a node of the migration group.

16. The method of claim 2 further comprising presenting an inventory view of the plurality of nodes to a user, the inventory view allowing the user to view a current state and a network ontology of a node of the plurality of nodes.

17. A system for migration of one or more nodes of an enterprise to a cloud infrastructure, the system comprising:
an administration console comprising a memory; and
a processor, coupled to the memory, to:
receive an indication of at least one node of a plurality of nodes to migrate from an enterprise network to a cloud computing infrastructure, the indicated node comprising a first virtual machine;
identify one or more related nodes of the plurality of nodes that have direct and indirect communication relationships with the indicated node, the related nodes comprising a second virtual machine;
generate, in view of the network ontology, a migration group comprising the indicated node and at least one node of the related nodes for the indicated node;
generate a migration configuration file for each node of the migration group, the migration-configuration file comprising service level agreement (SLA) information;
deploy a migration agent to each node of the migration group; and
migrate the migration group to a cloud infrastructure, wherein each node of the migration group is migrated using a corresponding migration-configuration file to generate an SLA for each node of the migration group with a provider of the cloud computing infrastructure in view of SLA information from the corresponding migration configuration file.

18. The system of claim 17 wherein the processor is to further determine a network ontology of the at least one node from one or more source-to-destination communication relationships during execution of one or more executables on the at least one node.

19. A non-transitory computer readable medium including instructions that, when executed by a computing device, cause the computing device to perform operations comprising:
receiving an indication of at least one node of a plurality of nodes to migrate from an enterprise network to a cloud computing infrastructure, the indicated node comprising a first virtual machine;
identifying one or more related nodes of the plurality of nodes that have direct and indirect communication relationships with the indicated node, the related nodes comprising a second virtual machine;

adding the indicated node and at least one node of the related nodes for the indicated node to a migration group;

preparing a migration-configuration file for each node of the migration group, the migration-configuration file comprising service level agreement (SLA) information;

deploying a migration agent to each node of the migration group; and migrating the migration group to the cloud computing infrastructure, wherein each node of the migration group is migrated using a corresponding migration-configuration file to generate an SLA for each node of the migration group with a provider of the cloud computing infrastructure in view of SLA information from the corresponding migration configuration file.

20. The non-transitory computer readable medium of claim 19 wherein the one or more related nodes are identified in view of a network ontology for the indicated node, the network ontology being created for the indicated node using a data collection agent deployed to the indicated node, the network ontology describing current state of the indicated node and the related nodes.

* * * * *